United States Patent
Roh et al.

(10) Patent No.: US 8,509,948 B2
(45) Date of Patent: Aug. 13, 2013

(54) WALKING ROBOT AND METHOD OF CONTROLLING THE SAME

(75) Inventors: Chang Hyun Roh, Seoul (KR); Woong Kwon, Seongnam-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 523 days.

(21) Appl. No.: 12/382,132

(22) Filed: Mar. 9, 2009

(65) Prior Publication Data

US 2009/0308668 A1 Dec. 17, 2009

(30) Foreign Application Priority Data

Jun. 11, 2008 (KR) .................. 10-2008-0054689

(51) Int. Cl.
*G06F 19/00* (2011.01)
(52) U.S. Cl.
USPC .............................. 700/245; 180/8.6; 901/1
(58) Field of Classification Search
USPC ................... 700/245; 180/8.6; 318/568.12; 901/1

See application file for complete search history.

(56) References Cited

U.S. PATENT DOCUMENTS

| 5,349,277 | A | * | 9/1994 | Takahashi et al. | 318/568.12 |
| 6,064,167 | A | * | 5/2000 | Takenaka et al. | 318/568.12 |
| 7,313,463 | B2 | * | 12/2007 | Herr et al. | 700/245 |
| 2005/0066397 | A1 | * | 3/2005 | Hidai et al. | 901/1 |
| 2005/0240307 | A1 | * | 10/2005 | Kuroki et al. | 700/245 |
| 2006/0033462 | A1 | * | 2/2006 | Moridaira | 318/568.12 |
| 2008/0258669 | A1 | * | 10/2008 | Fukuda et al. | 318/568.12 |
| 2008/0297091 | A1 | * | 12/2008 | Park et al. | 318/568.12 |

FOREIGN PATENT DOCUMENTS

JP 5-305583 11/1993

* cited by examiner

*Primary Examiner* — Thomas Black
*Assistant Examiner* — Shardul Patel
(74) *Attorney, Agent, or Firm* — Staas & Halsey LLP (57) ABSTRACT

Disclosed are a walking robot and a method of controlling the same, in which impedance control and torso tilt control are achieved complementarily such that impedance can be adjusted according to the tilt of a torso or the tilt of the torso can be adjusted according to the impedance. The method includes measuring a moment of a foot; measuring a tilt of a torso; adjusting the scale of the measured moment based on the tilt of the torso, and controlling the foot based on the scale-adjusted moment; and adjusting the scale of the measured tilt based on a ZMP variation amount of the foot, and controlling the tilt of the torso based on the scale-adjusted ZMP variation amount.

19 Claims, 6 Drawing Sheets

FIG. 6

WALKING ROBOT AND METHOD OF CONTROLLING THE SAME

CROSS-REFERENCE TO RELATED APPLICATIONS

This application claims the benefit of Korean Patent Application No. 2008-0054689, filed Jun. 11, 2008, in the Korean Intellectual Property Office, the disclosure of which is incorporated herein by reference.

BACKGROUND

1. Field

The present invention relates to a robot, and more particularly to a walking robot with a plurality of legs, which walks using the plurality of legs, and a method of controlling the same.

2. Description of the Related Art

In general, robots are machines which conduct motions similar to those of a human. Early robots were industrial robots, such as manipulators or transfer robots for automation and unmanned production. Recently, a walking robot, which models the biped walking of a human, has been researched and developed. The biped walking robot has disadvantages, such as instability and difficulty in pose control or walking control, as compared with the quadruped or hexapod walking. However, the bipedal robot has advantages, such as more flexibly coping with an uneven surface of ground (i.e., a rugged road) or a discontinuous walking surface (for example, stairs).

In an impedance control method, which is one of methods of controlling a walking robot, positions and angles of ankles are changed in proportion to forces measured by force/torque (F/T) sensors respectively installed on soles of the feet, and thus the feet are stuck to the ground. The impedance control method lowers the stiffnesses of ankle joints and thus has a weak supporting force by the ground and accompanies the tilt of a torso. The impedance control method uses a fixed impedance control gain, and thus causes a walking robot to unstably walk on ground having various prominences and depressions. Further, the impedance control method measures and uses only the repulsive force from the ground, and thus the feet of the walking robot do not stick strongly to the ground. Moreover, the impedance control method estimates the tilt of a torso through ZMP calculation, and thus it is difficult to precisely correct the tilt of the torso.

SUMMARY

Accordingly, it is an aspect of the present invention to provide a walking robot and a method of controlling the same, in which impedance control and torso tilt control are achieved complementarily such that impedance can be adjusted according to the tilt of a torso or the tilt of the torso can be adjusted according to the impedance, to enhance the walking stability of the walking robot.

Additional aspects and/or advantages will be set forth in part in the description which follows and, in part, will be apparent from the description, or may be learned by practice of the invention.

The foregoing and/or other aspects of the present invention are achieved by providing a method of controlling a walking robot, including measuring a moment of a foot of the robot; measuring a tilt of a torso of the robot; adjusting a scale of the measured moment based on the measured tilt of the torso, and controlling the foot based on the scale-adjusted moment; and adjusting the scale of the measured tilt based on a ZMP variation amount of the foot, and controlling the tilt of the torso based on the scale-adjusted ZMP variation amount.

The method further includes controlling the foot based on the measured moment, when the measured tilt of the torso exceeds a predetermined range; and scaling down the measured moment and controlling the foot based on the scaled-down moment, when the measured tilt of the torso does not exceed the predetermined range.

The ZMP variation amount may be a ZMP error between an actual ZMP of the foot and a target ZMP, the method further including compensating for the tilt of the torso to reduce the ZMP error, when the ZMP error exceeds a predetermined range; and scaling down the tilt of the torso and compensating for the tilt of the torso form based on the scaled-down tilt, when the ZMP error does not exceed a predetermined range.

The method may further include removing high-frequency disturbance of the moment due to landing impact, prior to the controlling of the foot.

The method may further include removing vibration disturbance of the torso due to landing impact, prior to the controlling of the tilt of the torso.

The controlling of the foot and the controlling of the tilt of the torso may be performed concurrently.

The determining the moment of the foot includes measuring with an F/T sensor; and the measuring tilt of the torso includes measuring with a pose sensor.

The foregoing and/or other aspects of the present invention may also be achieved by providing a method of controlling a walking robot, including measuring a moment of a foot of the robot; measuring a tilt of a torso of the robot; controlling the foot based on the measured moment to increase the walking stability of the walking robot, when the tilt of the torso exceeds a predetermined range; and controlling the tilt of the torso to reduce a ZMP error between an actual ZMP of the foot and a target ZMP, when the ZMP error exceeds a predetermined range.

The method may further include scaling down the measured moment, when the tilt of the torso does not exceed the predetermined range; and controlling the foot based on the scaled-down moment.

The method may further include scaling down the measured tilt of the torso, when the ZMP error does not exceed the predetermined range; and compensating for the tilt of the torso based on the scaled-down tilt.

The method may further include removing a high-frequency disturbance of the moment due to landing impact, prior to the controlling of the foot.

The method may further include removing a vibration disturbance of the torso due to landing impact, prior to the controlling of the tilt of the torso.

The controlling of the foot and the controlling of the tilt of the torso may be performed concurrently.

The measuring the moment of the foot may include using an F/T sensor; and the measuring the tilt of the torso may include using a pose sensor.

The foregoing and/or other aspects of the present invention may also be achieved by providing a walking robot including a foot; a torso; a plurality of legs supporting the torso; a plurality of first sensors to respectively measure moments of the plurality of legs; a second sensor to measure a tilt of the torso; and a control unit to adjust a scale of the measured moments based on the tilt of the torso and to control the foot based on the scale-adjusted moment, and to adjust a scale of the measured tilt based on a ZMP variation amount of the foot and control the tilt of the torso based on the scale-adjusted ZMP variation amount.

The walking robot may further include a first signal changing unit to scale down the measured moment, when the tilt of the torso does not exceed a predetermined range; and a second signal changing unit to scale down the tilt of the torso, when the ZMP variation amount does not exceed a predetermined range.

The ZMP variation amount may be a ZMP error between an actual ZMP of the foot and a target ZMP.

The first signal changing unit may output the unchanged measured moment, when the tilt of the torso exceeds the predetermined range.

The second signal changing unit may output the unchanged measured tilt of the torso, when the ZMP variation amount exceeds the predetermined range.

The foregoing and/or other aspects of the present invention may also be achieved by providing a method of controlling a walking robot, comprising controlling an impedance of the walking robot and a torso tilt of the walking robot complementarily, comprising adjusting the impedance according to the torso tilt or adjusting the torso tilt according to the impedance.

BRIEF DESCRIPTION OF THE DRAWINGS

These and/or other aspects and advantages will become apparent and more readily appreciated from the following description of the embodiments, taken in conjunction with the accompanying drawings in which.

DETAILED DESCRIPTION OF EMBODIMENTS

Reference will now be made in detail to the embodiment, an example of which is illustrated in the accompanying drawings, wherein like reference numerals refer to like elements throughout. The embodiment is described below to explain the present invention by referring to the figures.

Figure 1:
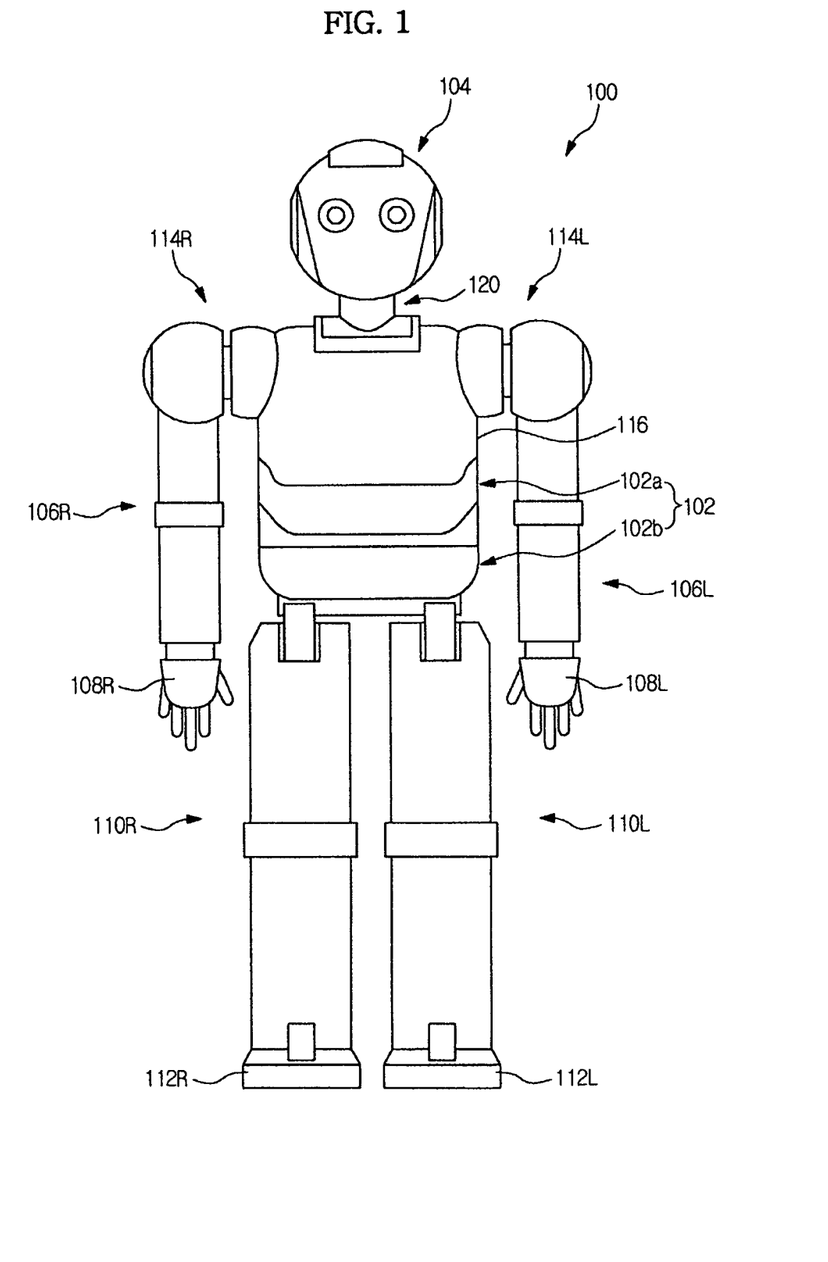
FIG. 1 is a schematic view illustrating a walking robot in accordance with an embodiment of the present invention.

FIG. 1 is a schematic view illustrating a walking robot in accordance with an embodiment of the present invention. As shown in FIG. 1, a head 104 is connected to the upper portion of a torso 102 of a walking robot 100 through a neck 120. Two arms 106L and 106R are connected to both sides of the upper portion of the torso 102 through shoulders 114L and 114R. Hands 108L and 108R are respectively connected to tips of the two arms 106L and 106R. Two legs 110L and 110R are connected to both sides of the lower portion of the torso 102. Feet 112L and 112R are respectively connected to the two legs 110L and 110R. The head 104, the two arms 106L and 106R, the two legs 110L and 110R, and the two hands 108L and 108R, and the two feet 112L and 112R respectively have designated degrees of freedom through joints. The inside of the torso 102 is protected by a cover 116. The torso 102 is divided into a breast 102a and a waist 102b. Here, L represents the left side of the walking robot 100, and R represents the right side of the walking robot 100.

Figure 2:
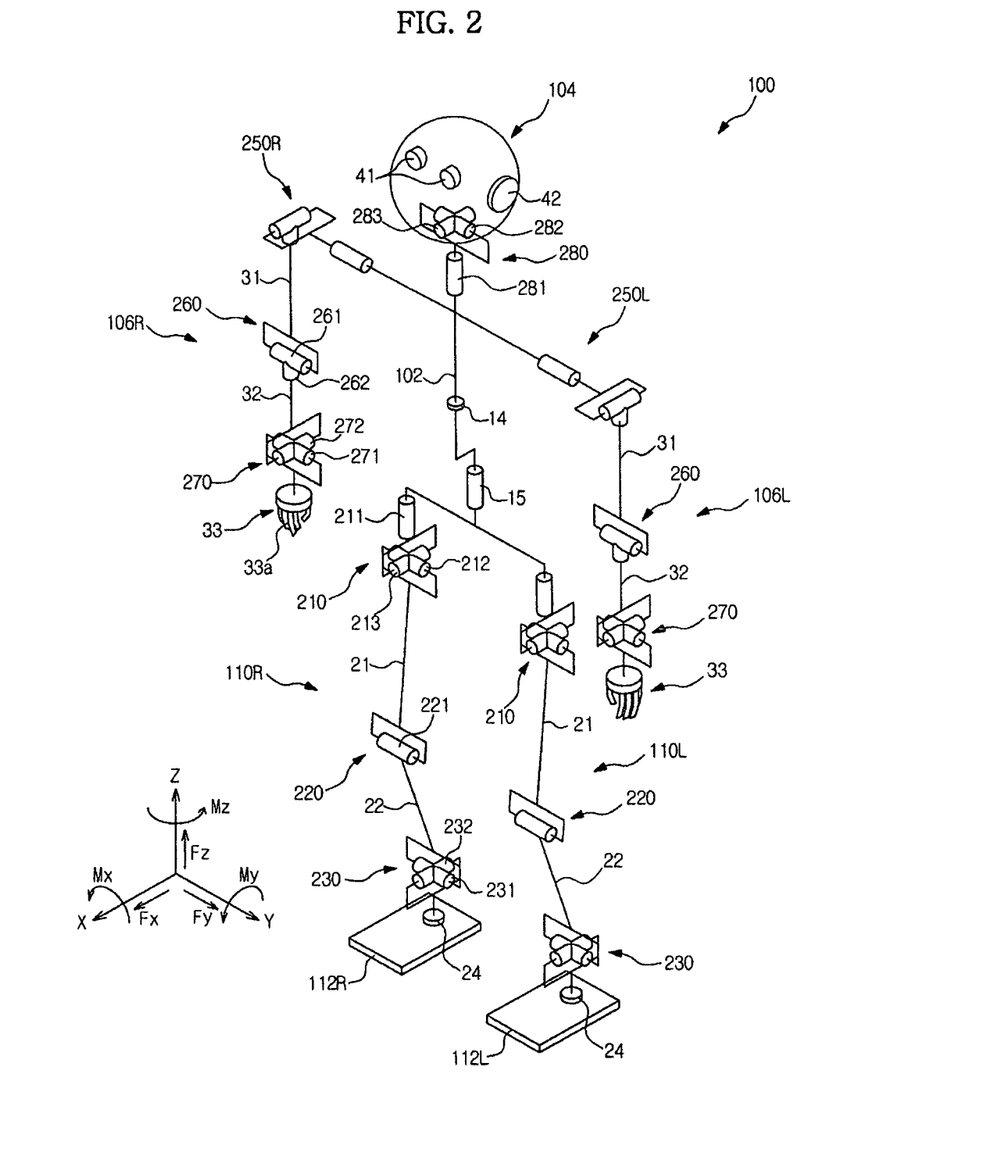
FIG. 2 is a view illustrating joint structures of the walking robot of FIG. 1.

FIG. 2 is a view illustrating joint structures of the walking robot of FIG. 1. As shown in FIG. 2, the two legs 110L and 110R of the walking robot 100 respectively include thigh links 21, calf links 22, and the feet 112L and 112R. The thigh links 21 are connected to the torso 102 by thigh joint units 210. The thigh links 21 and the calf links 22 are connected to each other by knee joint units 220, and the calf links 22 and the feet 112L and 112R are connected to each other by ankle joint units 230.

The thigh joint units 210 have 3 degrees of freedom. Specifically, the thigh joint units 210 respectively include rotary joints 211 in a yaw direction (on the z-axis), rotary joints 212 in a pitch direction (on the y-axis), and rotary joints 213 in a roll direction (on the x-axis).

The knee joint units 220 respectively include rotary joints 221 in the pitch direction, and thus have 1 degree of freedom. The ankle joint units 210 respectively include rotary joints 231 in the pitch direction and rotary joints 232 in the roll direction, and thus have 2 degrees of freedom.

Since the two legs 110L and 110R respectively include six rotary joints of three joint units 210, 220 and 230, as described above, the walking robot 100 includes twelve rotary joints.

Multi-axis force and torque (F/T) sensors 24 are respectively installed between the feet 112L and 112R and the ankle joint units 230 of the two legs 110L and 110R. The multi-axis FIT sensors 24 measure three-directional components (Mx, My, Mz) of moment and three-directional components (Fx, Fy, Fz) of force transmitted from the feet 112L and 112R, and thus detect whether or not the legs 112L and 112R land and a load applied to the feet 112L and 112R.

Cameras 41 serving as eyes of the walking robot 100 and microphones 42 serving as ears of the walking robot 100 are installed on the head 104.

The head 104 is connected to the torso 102 by a neck joint unit 280. The neck joint unit 280 includes a rotary joint 281 in the yaw direction, a rotary joint 282 in the pitch direction, and a rotary joint 283 in the roll direction, and thus has 3 degrees of freedom.

Motors (not shown) rotating the head 104 are respectively connected to the rotary joints 281, 282, and 283 of the neck joint unit 280.

Shoulder joint assemblies 250L and 250R are installed at both sides of the torso 102, and connect the two arms 106L and 106R to the torso 102.

The two arms 106L and 106R respectively include upper arm links 31, lower arm links 32, and the hands 108L and 108R. The upper arm links 31 are connected to the torso 102 by the shoulder joint assemblies 250L and 250R. The upper arm links 31 and the lower arm links 32 are connected to each other by elbow joint units 260, and the lower arm links 32 and the hands 108L and 108R are connected to each other by wrist joint units 270.

The elbow joint units 260 respectively include rotary joints 261 in the pitch direction and rotary joints 262 in the yaw direction, and thus have 2 degrees of freedom. The wrist joint units 270 respectively include rotary joints 271 in the pitch direction and rotary joints 272 in the roll direction, and thus have 2 degrees of freedom.

Five fingers 33a are respectively installed on each of the hands 108L and 108R. A plurality of joints (not shown), each of which is driven by a motor, are respectively installed on the fingers 33a. The fingers 33a interlock with the motion of the arms 106L and 106R, and perform various motions, such as gripping an object or pointing out a specific direction.

A pose sensor 14 is installed on the torso 102. The pose sensor 14 detects a tilt angle of the torso 102 to a perpendicular axis and its angular velocity, and generates pose data. The pose sensor 14 may be installed on the head 104 as well as the torso 102. Further, a rotary joint 15 in the yaw direction to rotate the breast 102a against the waist 102b is installed between the breast 102a and the waist 102b of the torso 102.

Although not shown in the drawings, motors to respectively drive the rotary joints are installed on the walking robot 100. A control unit, which controls the whole operation of the walking robot 100, properly controls the motors, thus allowing the walking robot 100 to perform various motions.

Figure 3:
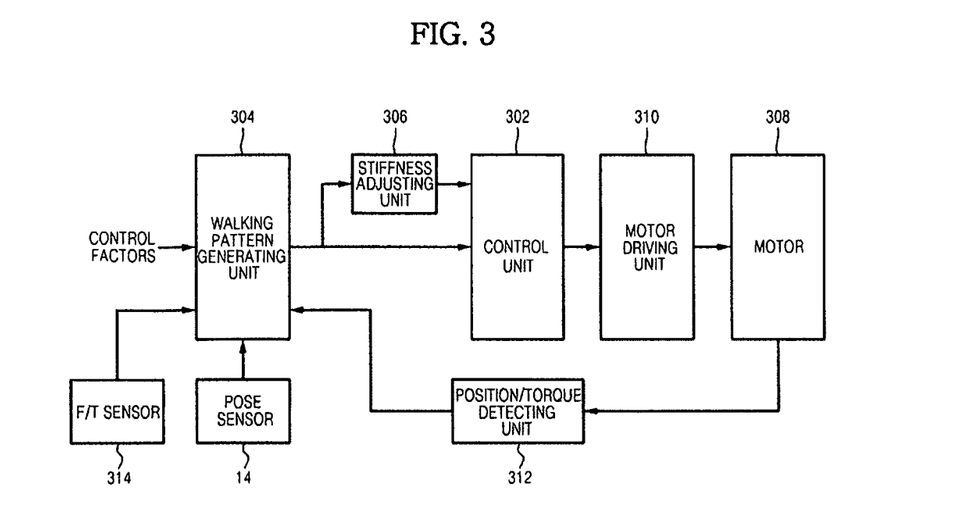
FIG. 3 is a view illustrating a control system of the walking robot of FIG. 1.

FIG. 3 is a view illustrating a control system of the walking robot in accordance with the embodiment of the present invention. As shown in FIG. 3, a walking pattern generating unit 304 and a stiffness adjusting unit 306 are communicably connected to the input side of a control unit 302 controlling the whole operation of the walking robot 100. Motors 308 to respectively move the joints and motor driving units 310 to drive the motors 308 are communicably connected to the output side of the control unit 302.

A position/torque detecting unit 312 detects positions and torques of the motors 308, and provides position/torque data to the walking pattern generating unit 304. The walking pattern generating unit 304 uses the position/torque data of the motors 308 to generate a walking pattern. Further, walking pattern generating unit 304 uses pose data supplied through the pose sensor 14 and moment data of the feet 112L and 112R supplied through F/T sensors 314 to generate the walking pattern.

The walking pattern generating unit 304 generates a walking pattern corresponding to control factors determining target walking direction, step length, walking speed of the walking robot 100, and generates a phase signal of a frequency corresponding to the walking pattern. Here, the walking pattern is generated in real time during walking as well as at the initial stage of walking. The phase signal generated by the walking pattern generating unit 304 is a signal to drive the respective legs 110 in various phases.

The walking pattern generated by the walking pattern generating unit 20 is inputted to the stiffness adjusting unit 306. The stiffness adjusting unit 306 adjusts stiffnesses of the respective joints based on the driving states of the respective legs 110 according to the walking pattern. The control unit 302 of the walking robot 100 in accordance with an embodiment of the present invention controls the respective joints such that corresponding joints maintain a high stiffness only if the high stiffness is required according to the walking pattern and the stiffnesses of the joints are lowered in other cases, thereby maintaining balance in gravity and inertia and thus allowing the robot 100 to naturally and effectively walk.

Figure 4:
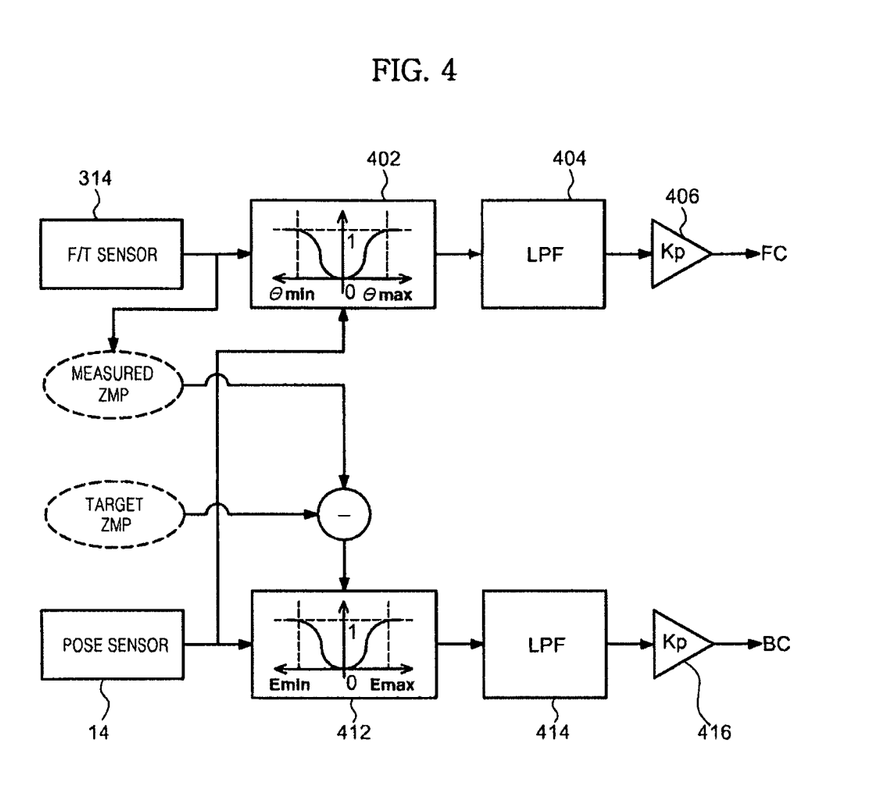
FIG. 4 is a view illustrating a concept of generating a control signal to control walking of the walking robot in accordance with the embodiment of the present invention, on an uneven surface.

FIG. 4 is a view illustrating a concept of generating a control signal to control walking of the walking robot in accordance with the embodiment of the present invention, on an uneven surface. As shown in FIG. 4, in this embodiment, detected results of the F/T sensors 314 and the pose sensor 14 are used to control the walking of the walking robot 100 on the uneven surface. The embodiment may be performed together with impedance control, in which force applied to the soles of the feet of the walking robot 100 is measured and the walking of the walking robot 100 is controlled based on the measured force.

In the control of the walking or the walking robot in accordance with the embodiment of the present invention, on the uneven surface, the rotary joints 231 in the pitch direction and the rotary joints 232 in the roll direction of the feet 112L and 112R of the walking robot 100 are controlled based on the moments detected through the F/T sensors 314 installed on the soles of the feet 112L and 112R of the robot 100. The moment detecting signal generated from the F/T sensor 314 passes through a signal changing unit 402 and a low pass filter 404, has an increased gain through an amplifier 406, and then is outputted as a foot control data (FC). That is, since a large moment is generated when the foot 112L or 112R lands on an uneven region, the tilting degree of the ground is determined through the moment detected by the FIT sensor 314, and thus the pose of the foot 112L or 112R is changed such that the foot 112L or 112R is stuck to the ground. Unless the foot 112L or 112R is stuck to the ground, the supporting force of the foot 112L or 112R to the ground is decreased and thus the torso 102 tilts.

However, the signal changing unit 402 causes the moment, detected by the F/T sensor 314, to be outputted as the foot control data (FC) to control the foot 112L or 112R when the tilt of the torso 102 of the walking robot 100 detected by the pose sensor 14 deviates from a predetermined allowable range. That is, the signal changing unit 402 generates the foot control data (FC) based on the moment of the F/T sensor 314 only if the tilt of the torso 102 of the walking robot 100 generated by the landing of the walking robot 100 on an uneven region is large and thus deviates from the allowable range, thus controlling the rotary joint 231 in the pitch direction and the rotary joint 232 in the roll direction of the foot 112L or 112R. On the other hand, if the tilt of the torso 102 of the walking robot 100 generated by the landing of the walking robot 100 on an uneven region is comparatively small and thus remains within the allowable range, the input of the moment is decreased and thus the stiffness of the supporting leg 112L or 112R is increased.

A pose detecting signal of the torso 102 of the robot 100 generated by the pose sensor 14 passes through a signal changing unit 412 and a low pass filter 414, has an increased gain through an amplifier 416, and then is outputted as a torso control data (BC). Here, the signal changing unit 412 causes a tilt detecting signal of the torso 102 detected by the pose sensor 14 to be outputted as the torso control data (BC) only if a difference between the current measured ZMP and a target ZMP, i.e., a ZMP error, is large and thus deviates from a predetermined allowable range. If the ZMP error is within the allowable range, the walking robot 100 walks along the planned walking pattern and thus it is unnecessary to generate the control of the torso 102. In case that the ZMP error is larger than the allowable range, the tilt of the torso 102 is corrected to reduce the ZMP error, thereby increasing the walking stability of the walking robot 100.

Figure 5A:
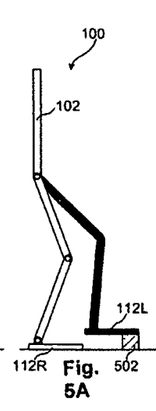
FIGS. 5A to 5E are views respectively illustrating walking poses of the walking robot on an uneven surface, in accordance with the embodiment of the present invention.
Figure 5B:
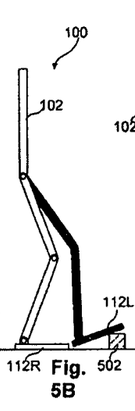
Figure 5C:
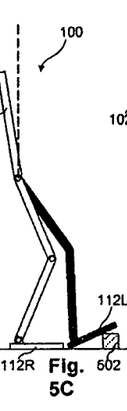

FIGS. 5A to 5E are views sequentially illustrating walking poses of the walking robot in accordance with the embodiment of the present invention, on an uneven surface. When the right foot 112R is a supporting foot and the left foot 112L lands after swinging, if an unevenness 502 exists at the landing point of the left foot 112L, as shown in FIG. 5A, states of the ankle of the left foot 112L and the torso 102 are different in the case of impedance control, as shown in FIG. 5B, and in the case of fixed impedance control gain, as shown in FIG. 5C. That is, in the case of impedance control, when impedance is varied according to force applied to the left foot 112, the sticking degree of the left foot 112 to the ground is enhanced but the stiffness of the left foot 112 is lowered. However, in the case of fixed impedance control gain, when the left foot 112 is stuck to the ground while maintaining stiffness, the torso 102 tilts backward.

Figures 5D, 5E:
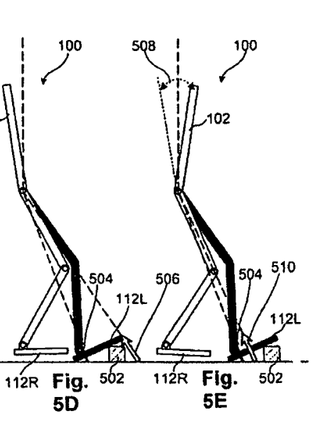

When the left foot 112L is supported by the ground and the right foot 112R is swung on the condition that the torso 102 tilts backward, as shown in FIG. 5D, the ZMP is changed from a position 504 to another position 506 due to the tilted torso 102 and the change of the supporting foot and the new position 506 of the ZMP is located out of the support polygon of the left foot 112L, i.e., the supporting foot. Thereby, the walking robot 100 loses its walking stability.

Then, when the ZMP is changed from the position 506 to another position 510 by correcting the tilt of the torso 102 by the same angle 508 of the current tilting angle in the opposite direction under the condition of FIG. 5E, the new position 510 of the ZMP is located in the support polygon of the left foot 112L, and thereby the walking robot 100 secures its walking stability.

Figure 6:
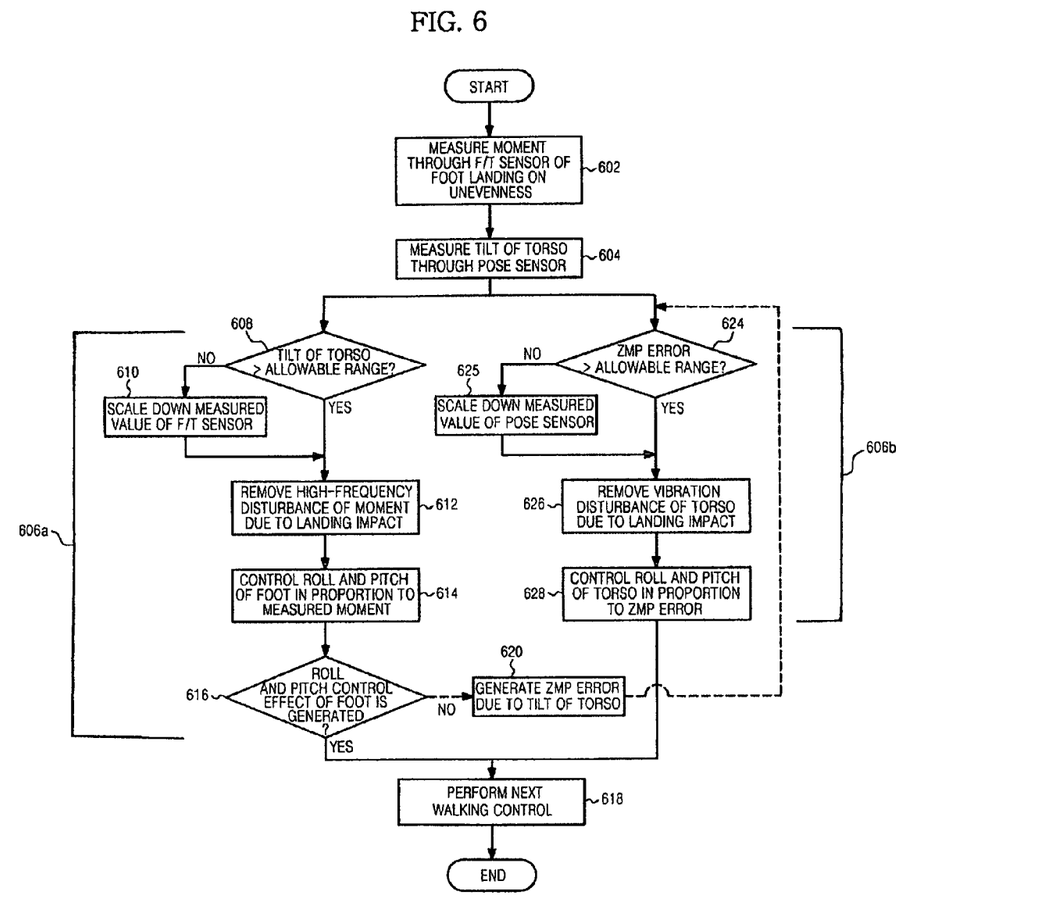
FIG. 6 is a flow chart illustrating a method of controlling a walking robot in accordance with an embodiment of the present invention.

FIG. 6 is a flow chart illustrating a method of controlling a walking robot in accordance with the embodiment of the present invention. The method shown in FIG. 6 will be described with reference to the walking poses of FIGS. 5A to 5E. As shown in FIG. 6, when a new support foot, for example, the left foot 112L, lands on the unevenness 502 on the walking surface, the F/T sensor 314 of the left foot 112L landing on the unevenness 502 measures a moment (operation 602). Further, the pose sensor 14 measures the tilt of the torso 102 (operation 604). Thereafter, a roll and pitch control process (operation 606a) of the supporting left foot 112L and a roll and pitch control process (operation 606b) of the torso 102 are performed concurrently.

First, in the roll and pitch control process (operation 606a) of the supporting left foot 112L, it is determined whether or not the tilt of the torso 102 measured by the pose sensor 14 exceeds an allowable range (operation 608). Here, the allowable range means the range of the tilt of the torso 102, which does not require additional control of the supporting left foot 112L to secure the walking stability of the walking robot 100. In case that the tilt of the torso 102 exceeds the allowable range (yes of operation 608), the moment measured by the F/T sensor 314 is used, as it is, to control the left foot 112L, and in case that the tilt of the torso 102 does not exceed the allowable range (no of operation 608), the measured value of the F/T sensor 314, i.e., the moment of the left foot 112L, is scaled down and the scaled-down moment is used to control the left foot 112L (operation 610). In order to control the left foot 112L using the original moment or the scaled-down moment, high-frequency disturbance of the moment due to landing impact is first removed (operation 612). Thereafter, roll and pitch control amounts of the left foot 112 in proportion to the moment measured by the F/T sensor 314 are calculated, and roll and pitch of the left foot 112L are controlled based on the calculated control amounts (operation 614). This roll and pitch control of the left foot 112L serves to solve the walking instability of the walking robot 100 generated when the left foot 112L lands on the unevenness 502. If the walking stability of the walking robot 100 is secured by the roll and pitch control of the left foot 112L (yes of operation 616), next walking control is performed (operation 618). On the other hand, in case that the walking stability of the walking robot 100 is not secured even by the roll and pitch control of the left foot 112L (no of operation 616), a ZMP error due to the tilt of the torso 102 is generated (operation 620).

Next, in the roll and pitch control process (operation 606b) of the torso 102, it is determined whether or not the ZMP error exceeds an allowable range (operation 624). If the ZMP error exceeds the allowable range (yes of operation 624), the tilt of the torso 102 measured by the pose sensor 14 is used, as it is, to control the tilt of the torso 102, and if the ZMP error does not exceed the allowable range (no of operation 624), the tilt of the torso 102 is scaled down and the scaled-down tilt is used to control the torso 102 (operation 625). In order to control the torso 102 using the original tilt of the torso 102 or the scaled-down tilt, vibration disturbance of the torso 102 due to landing impact is first removed (operation 626). Thereafter, roll and pitch control amounts of the torso 102 in proportion to the ZMP error are calculated, and roll and pitch of the torso 102 is controlled based on the calculated control amounts (operation 628). This roll and pitch control of the torso 102 serves to solve the walking instability of the walking robot 100 generated when the left foot 112L lands on the unevenness 502. After the walking stability of the walking robot 100 is secured by the roll and pitch control of the torso 102, next walking control is performed (operation 618).

As apparent from the above description, the embodiment of the present invention provides a walking robot and a method of controlling the same, in which impedance control and torso tilt control are achieved complementarily such that impedance can be adjusted according to the tilt of a torso or the tilt of the torso can be adjusted according to the impedance, to enhance the walking stability of the walking robot.

Although an embodiment of the invention has been shown and described, it would be appreciated by those skilled in the art that changes may be made in this embodiment without departing from the principles and spirit of the invention, the scope of which is defined in the claims and their equivalents.

What is claimed is:

1. A method of controlling a walking robot, comprising:
measuring a moment of a foot of the robot;
measuring a tilt of a torso of the robot;
reducing a scale of the measured moment prior to controlling the foot if the measured tilt of the torso is within a predetermined range;
controlling, by way of at least one processor, the foot based on the scale-reduced moment;
adjusting the scale of the measured tilt based on a ZMP variation amount of the foot; and
controlling the tilt of the torso based on the scale-adjusted tilt.

2. The method according to claim 1, further comprising:
controlling the foot based on the measured moment, when the measured tilt of the torso exceeds a predetermined range.

3. The method according to claim 1, wherein:
the ZMP variation amount is a ZMP error between an actual ZMP of the foot and a target ZMP, the method further comprising:
compensating for the tilt of the torso to reduce the ZMP error, when the ZMP error exceeds a predetermined range; and
scaling down the tilt of the torso and compensating for the tilt of the torso based on the scaled-down tilt, when the ZMP error does not exceed a predetermined range.

4. The method according to claim 1, further comprising removing high-frequency disturbance of the moment due to landing impact, prior to the controlling of the foot.

5. The method according to claim 1, further comprising removing vibration disturbance of the torso due to landing impact, prior to the controlling of the tilt of the torso.

6. The method according to claim 1, wherein the controlling of the foot and the controlling of the tilt of the torso are performed concurrently.

7. The method according to claim 1, wherein the measuring the moment of the foot comprises measuring with a F/T sensor; and the measuring the tilt of the torso comprises measuring with a pose sensor.

8. A method of controlling a walking robot, comprising:
measuring a moment of a foot of the robot;
reducing a scale of the measured moment prior to controlling the foot if the measured tilt of the torso is within a predetermined range;
measuring a tilt of a torso of the robot;
controlling, by way of at least one processor, the foot based on the scale-reduced moment to increase the walking stability of the walking robot, when the tilt of the torso exceeds a predetermined range; and
controlling the tilt of the torso to reduce a ZMP error between an actual ZMP of the foot and a target ZMP, when the ZMP error exceeds a predetermined range.

9. The method according to claim 8, further comprising:
scaling down the measured moment, when the tilt of the torso does not exceed the predetermined range; and
controlling the foot based on the scaled-down moment.

10. The method according to claim 8, further comprising:
scaling down the measured tilt of the torso, when the ZMP error does not exceed the predetermined range; and
compensating for the tilt of the torso based on the scaled-down tilt.

11. The method according to claim 8, further comprising removing a high-frequency disturbance of the moment due to landing impact, prior to the controlling of the foot.

12. The method according to claim 8, further comprising removing a vibration disturbance of the torso due to landing impact, prior to the controlling of the tilt of the torso.

13. The method according to claim 8, wherein the controlling of the foot and the controlling of the tilt of the torso are performed concurrently.

14. The method according to claim 8, wherein the measuring the moment of the foot comprises using a F/T sensor; and the measuring the tilt of the torso comprises using a pose sensor.

15. A walking robot comprising:
a torso;
a plurality of feet supporting the torso;
a plurality of first sensors to respectively measure moments of the plurality of feet;
a second sensor to measure a tilt of the torso;
a first signal changing unit to scale down the measured moment prior to controlling the plurality of feet, when the tilt of the torso does not exceed a predetermined range; and
a control unit to control the plurality of feet based on the scale-adjusted moment, and to adjust a scale of the measured tilt based on a ZMP variation amount of the plurality of feet and control the tilt of the torso based on the scale-adjusted ZMP variation amount.

16. The walking robot according to claim 15, further comprising:
a second signal changing unit to scale down the tilt of the torso, when the ZMP variation amount does not exceed a predetermined range.

17. The walking robot according to claim 16, wherein the ZMP variation amount is a ZMP error between an actual ZMP of the foot and a target ZMP.

18. The walking robot according to claim 16, wherein the first signal changing unit outputs the unchanged measured moment, when the tilt of the torso exceeds the predetermined range.

19. The walking robot according to claim 16, wherein the second signal changing unit outputs the unchanged measured tilt of the torso, when the ZMP variation amount exceeds the predetermined range.

* * * * *